United States Patent
Goto et al.

(10) Patent No.: US 9,791,299 B2
(45) Date of Patent: Oct. 17, 2017

(54) DIAGNOSTIC DEVICE

(71) Applicant: HITACHI AUTOMOTIVE SYSTEMS, LTD., Hitachinaka-shi, Ibaraki (JP)

(72) Inventors: Kosei Goto, Hitachinaka (JP); Satoru Shigeta, Hitachinaka (JP); Atsushi Okabe, Tokyo (JP); Kohei Myoen, Hitachinaka (JP); Yuuichirou Takamune, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 136 days.

(21) Appl. No.: 14/781,091

(22) PCT Filed: Jan. 31, 2014

(86) PCT No.: PCT/JP2014/052191
§ 371 (c)(1),
(2) Date: Sep. 29, 2015

(87) PCT Pub. No.: WO2014/156291
PCT Pub. Date: Oct. 2, 2014

(65) Prior Publication Data
US 2016/0054152 A1 Feb. 25, 2016

(30) Foreign Application Priority Data
Mar. 29, 2013 (JP) .................. 2013-071149

(51) Int. Cl.
*G01V 3/00* (2006.01)
*G01D 18/00* (2006.01)
*G01D 5/20* (2006.01)
*G01D 5/244* (2006.01)

(52) U.S. Cl.
CPC ........... *G01D 5/204* (2013.01); *G01D 5/2073* (2013.01); *G01D 5/24466* (2013.01)

(58) Field of Classification Search
CPC ... G01D 5/204; G01D 5/24466; G01D 5/2073
USPC .............................. 324/207.12, 322; 73/1.01
See application file for complete search history.

(56) References Cited

U.S. PATENT DOCUMENTS

2005/0252272 A1* 11/2005 Otsuka ............... G01D 5/24461
73/1.01
2012/0217910 A1* 8/2012 Kawano .................... H02P 6/08
318/400.02

FOREIGN PATENT DOCUMENTS

JP 3402207 2/2003
JP 2005-308634 A 11/2005

* cited by examiner

Primary Examiner — Farhana Hoque
(74) Attorney, Agent, or Firm — Volpe and Koenig, P.C.

(57) ABSTRACT

A diagnostic device capable of accurately diagnosing the soundness of a resolver circuit is provided. A shifter receives excitation signal and excitation signal; shifts the level of excitation signal, excitation signal, or both; and performs level shifting such that a period of time that starts with one of two times in which, in the vicinity of the peak value of excitation signal, excitation signal and excitation signal are at the same value and ends with the other of the two times is less than a prescribed threshold. A trigger generation circuit generates a trigger during said period of time. A control unit determines whether there is an abnormality in the resolver circuit on the basis of the trigger.

5 Claims, 9 Drawing Sheets

DIAGNOSTIC DEVICE

TECHNICAL FIELD

The present invention relates to a diagnostic device that detects an abnormality in a resolver circuit that calculates a rotational angle of a vehicular motor.

BACKGROUND ART

When a vehicular motor to be mounted on a vehicle, such as a plug-in hybrid electric vehicle (PHEV) or an electric vehicle (EV) is controlled, it is necessary to satisfy a functional safety standard of ISO 26262 Therefore, achieving the following safety goal is typically required.

(1) The motor does not rotate in a direction reverse to an intentional rotating direction (ASIL-C or D).

(2) The motor does not output unintentional torque and a rotational speed (ASIL-C or D).

In order to achieve the above safety goal, it is necessary to dispose a safety mechanism that stops drive of the motor when abnormal rotation of the vehicular motor is detected.

Ina conventional resolver circuit, based on output signals (SIN signal and COS signal) from a resolver, a resolver digital converter (RDC) calculates and outputs a rotational angle θ of a motor to an external microcomputer. The external microcomputer performs feedback control to the motor based on the rotational angle θ of the motor supplied from the RDC.

Therefore, in order to dispose the above safety mechanism, the resolver circuit that calculates the rotational angle θ of the vehicular motor is required to be sound.

Regarding this point, based on an interval between zero crossing points of an excitation signal to be supplied to an excitation coil of the resolver, it has been known a device that samples the output signals (SIN signal and COS signal) from the resolver and calculates sin θ and cos θ so as to detect an abnormality in the resolver circuit (for example, refer to Patent Literature 1).

CITATION LIST

Patent Literature

Patent Literature 1: Japanese Patent No. 3402207

SUMMARY OF INVENTION

Technical Problem

In a diagnostic device disclosed in Paten Literature 1, even when there is an abnormality in an amplitude of an excitation signal, zero crossing points do not vary. Therefore, the abnormality in the amplitude of the excitation signal cannot be detected. In other words, in the conventional diagnostic device, soundness of a resolver circuit is sometimes not diagnosed accurately.

An object of the present invention is to provide a diagnostic device that can accurately diagnose soundness of a resolver circuit.

Solution to Problem

In order to achieve the above object, the present invention includes: a shifter configured to receive an excitation signal EXC+ to be input to a first end of an excitation coil of a resolver and the excitation signal EXC− to be input to a second end of the excitation coil, and shift a level of at least one of the excitation signal EXC+ and the excitation signal EXC− so that a period from first timing as a starting point to second timing as an end point becomes equal to or less than a predetermined threshold, the first timing and the second timing at which the excitation signal EXC+ and the excitation signal EXC− have a same value in a vicinity of a peak value of the excitation signal EXC+; a trigger generation circuit configured to generate a trigger during the period; and a control unit configured to diagnose whether there is an abnormality in a resolver circuit based on the trigger.

Advantageous Effects of Invention

According to the present invention, soundness of a resolver circuit can be accurately diagnosed. Problems, configurations, and effects other than the above descriptions will be clear in the following embodiments.

DESCRIPTION OF EMBODIMENTS

[First Embodiment]

A configuration and operation of a diagnostic device 100A according to a first embodiment of the present invention will be described below using FIGS. 1 to 5. The diagnostic device 100A is a device that detects an abnormality in a resolver circuit calculating a rotational angle θ of a vehicular motor.

Figure 1:
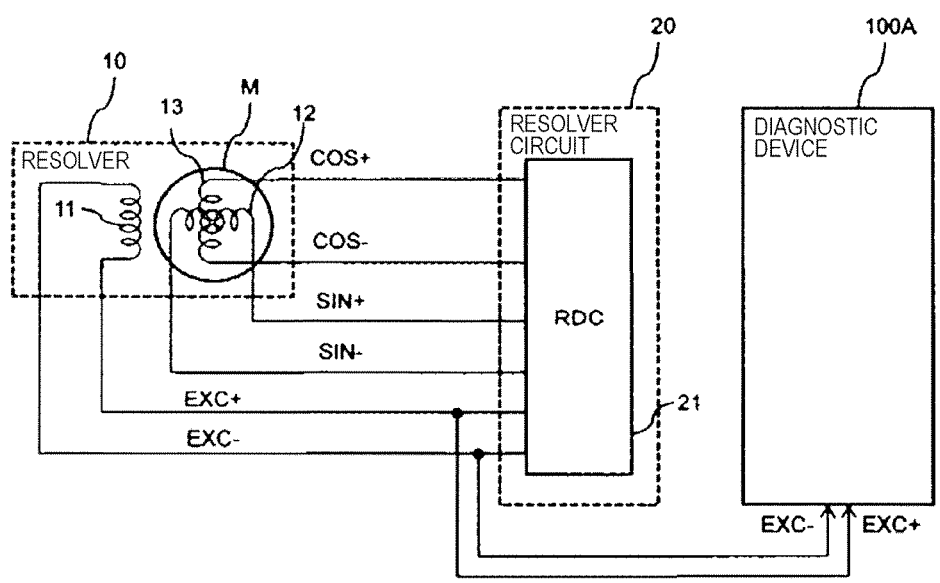
FIG. 1 is a block diagram of a configuration of a resolver system including a diagnostic device according to a first embodiment of the present invention.

First of all, an entire configuration of a resolver system including the diagnostic device 100A according to the first embodiment of the present invention will be described using FIG. 1. FIG. 1 is a block diagram of the configuration of the resolver system including the diagnostic device 100A according to the first embodiment of the present invention.

The resolver system includes a motor M, a resolver 10, a resolver circuit 20, and the diagnostic device 100A.

The motor M is a motor that drives the vehicle.

The resolver 10 is a typical angular sensor that detects the rotational angle θ of the motor M. The resolver 10 includes an excitation coil 11 (primary coil), and secondary coils 12 and 13. The resolver 10 is coaxially attached to the motor M.

According to the present embodiment, an excitation signal EXC− of a sine wave is input into a first end of the excitation coil 11 (negative pole). An excitation signal EXC+ that is the inverted excitation signal EXC−, is input into a second end of the excitation coil 11 (positive pole).

Accordingly, a first end of the secondary coil 12 outputs an output signal SIN+ corresponding to the rotational angle θ of the motor. A second end of the secondary coil 12 outputs an output signal SIN− corresponding to the rotational angle θ of the motor.

Meanwhile, the secondary coil 13 is disposed so as to output an output signal that has a phase shifted from that of the secondary coil 12 by 90°. A first end of the secondary coil 13 outputs an output signal COS+. A second end of the secondary coil 13 outputs an output signal COS−.

The resolver circuit 20 includes a resolver digital converter (RDC) 21. Here, the RDC 21 may be a resolver IC.

The RDC 21 generates the excitation signals EXC+ and EXC− so as to supply the excitation signals EXC+ and EXC− to the excitation coil 11 of the resolver 10 and the diagnostic device 100A. The RDC 21 receives the output signals SIN+ and SIN− from the secondary coil 12 of the resolver 10 and receives the output signals COS+ and COS− from the secondary coil 13 of the resolver 10. The RDC 21 calculates the rotational angle θ of the motor based on these output signals.

Based on the excitation signals EXC+ and EXC−, the diagnostic device 100A detects an abnormality in an amplitude of each of the excitation signals EXC+ and EXC− so as to detect an abnormality in the resolver circuit 20. A detailed description of the diagnostic device 100A will be given later using FIG. 2.

Figure 2:
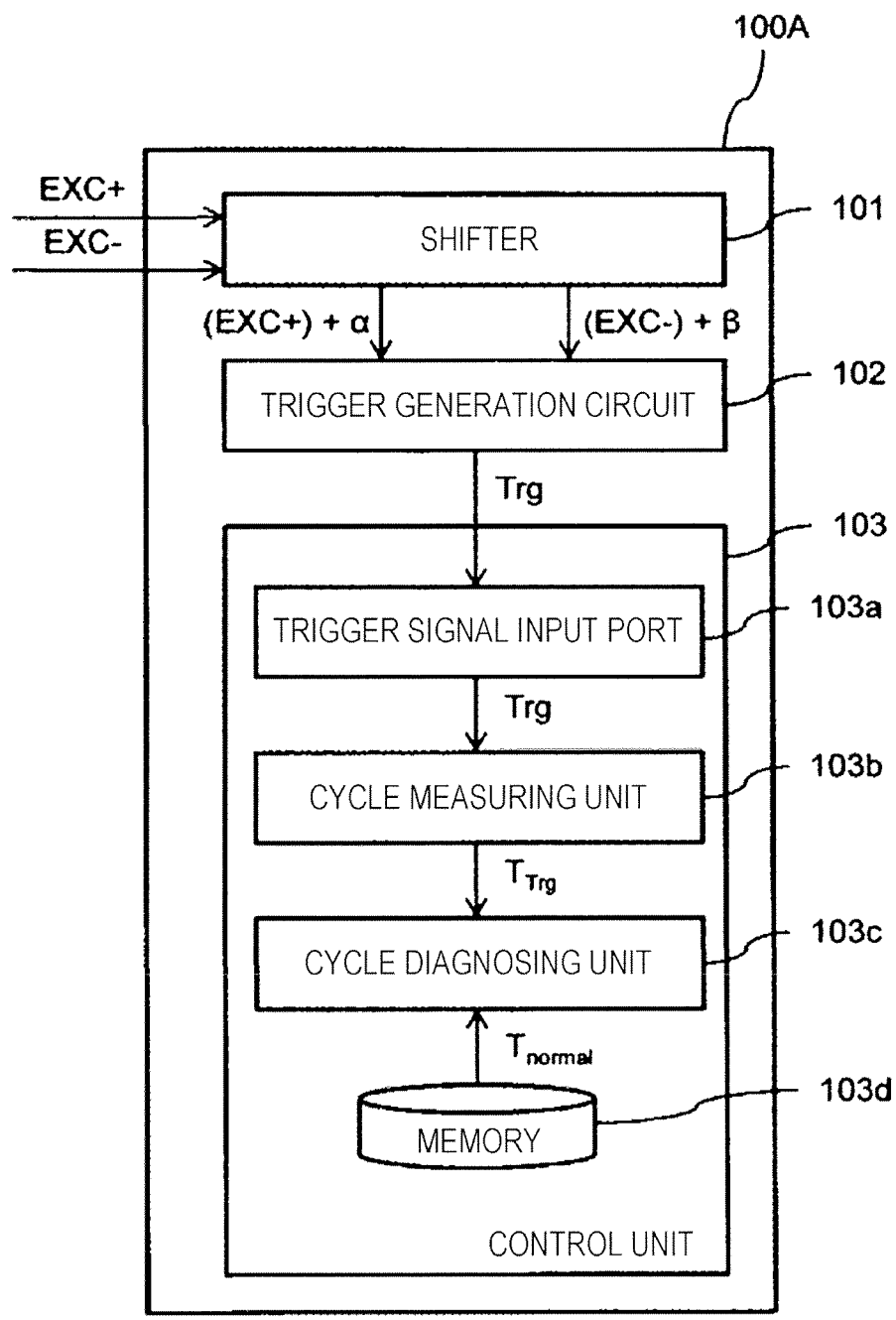
FIG. 2 is a block diagram of a configuration of the diagnostic device according to the first embodiment of the present invention.

Next, a configuration of the diagnostic device 100A according to the first embodiment of the present invention will be described using FIG. 2. FIG. 2 is a block diagram of the configuration of the diagnostic device 100A according to the first embodiment of the present invention.

The diagnostic device 100A includes a shifter 101, a trigger generation circuit 102, and a control unit 103.

The shifter 101 receives the excitation signals EXC+ and EXC− and shifts levels of the excitation signals EXC+ and EXC− by +α and +β, respectively, so as to supply the level-shifted excitation signals (EXC+)+α and (EXC−)−β to the trigger generation circuit 102. A detailed description of operation of the shifter 101 will be given later using FIGS. 3 and 4.

Based on the level-shifted excitation signals (EXC+)+α and (EXC−)−β, the trigger generation circuit 102 generates a trigger signal Trg that indicates timing of a peak of the excitation signal ESC+ so as to supply the trigger signal Trg to the control unit 103. A detailed description of operation of the trigger generation circuit 102 will be given later using FIG. 4.

The control unit 103 includes, for example, a microcomputer. The control unit 103 includes a trigger signal input port 103a, a cycle measuring unit 103b, a cycle diagnosing unit 103c, and a memory 103d.

The trigger signal input port 103a receives the trigger signal Trg from the trigger generation circuit 102 so as to supply the trigger signal Trg to the cycle measuring unit 103b.

The cycle measuring unit 103b measures a cycle of the trigger signal Trg so as to supply the measured value $T_{Trg}$ to the cycle diagnosing unit 103c.

The cycle diagnosing unit 103c determines that there is the abnormality in the resolver circuit 20 when the cycle $T_{Trg}$ of the trigger signal Trg supplied from the cycle measuring unit 103b is different from a cycle $T_{normal}$ that has already been stored in the memory 103d. Here, the cycle $T_{normal}$ is a cycle of the trigger signal Trg when the RDC 21 is normal.

Figure 3:
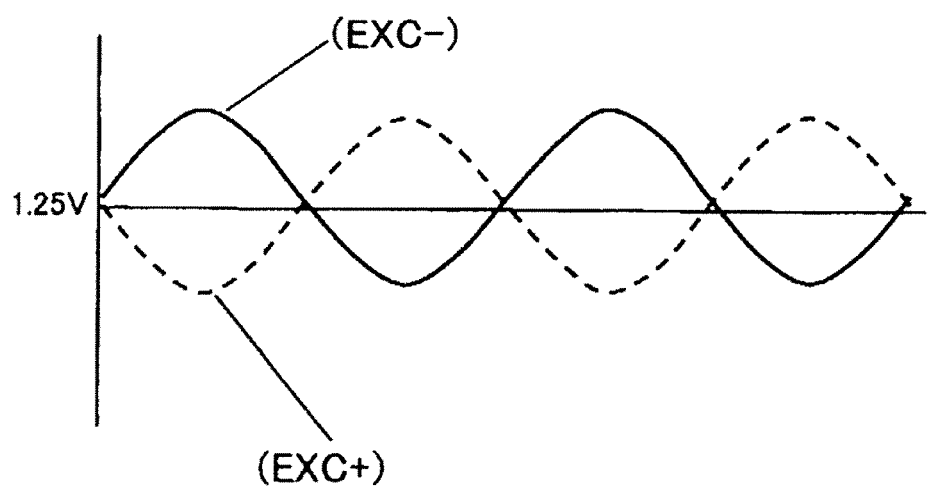
FIG. 3 is an explanatory graphical representation of an excitation signal generated by an RDC used in the diagnostic device according to the first embodiment of the present invention.

Next, the excitation signals EXC+ and EXC− generated by the RDC 21 will be described using FIG. 3. FIG. 3 is an explanatory graphical representation illustrating the excitation signals EXC+ and EXC− generated by the RDC 21 and used for the diagnostic device 100A according to the first embodiment of the present invention. Note that, in FIG. 3, the horizontal axis represents time and the vertical axis represents a voltage value of the excitation signals.

According to the present embodiment, the excitation signal EXC− is a sine wave and the excitation signal EXC+ is an inverted excitation signal EXC−.

Figure 4:
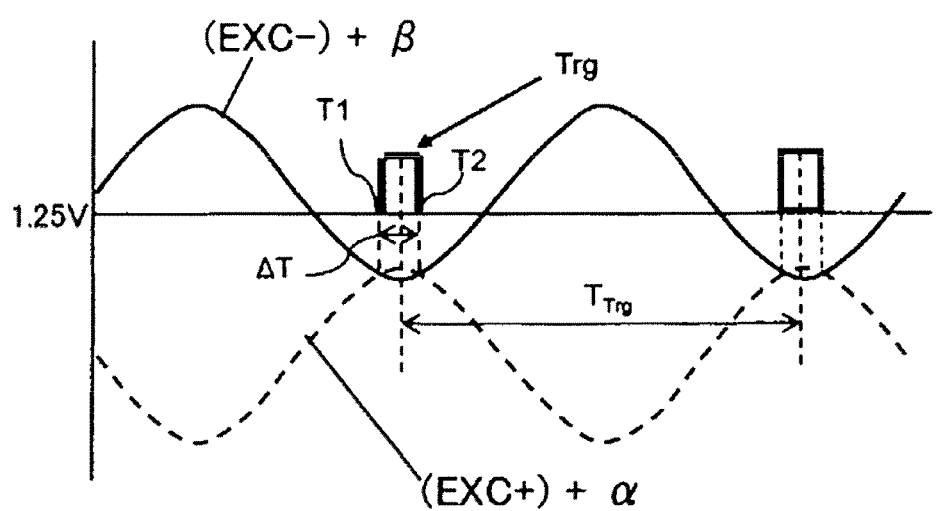
FIG. 4 is an explanatory graphical representation of operation of the diagnostic device according to the first embodiment of the present invention.

Next, operation of the diagnostic device 100A according to the first embodiment of the present invention will be described using FIG. 4. FIG. 4 is an explanatory graphical representation of the operation of the diagnostic device 100A according to the first embodiment of the present invention. Note that, in FIG. 4, the horizontal axis represents time and the vertical axis represents a voltage value of the excitation signals.

The shifter 101 shifts level of the excitation signal EXC+ supplied from the RDC 21 by +α and shifts level of the excitation signal EXC− supplied from the RDC 21 by +β. That is, the excitation signals illustrated in FIG. 4 are caused by moving the excitation signals illustrated in FIG. 3 in the vertical direction in parallel.

Here, the excitation signal EXC+ and the excitation signal EXC− have the same voltage value at first timing and second timing in the vicinity of the peak value of the excitation signal EXC+. The shifter 101 shifts the levels of the excitation signals EXC+ and EXC− so that a period ΔT from the first timing (earlier) as a starting point T1 to the second timing (later) as an endpoint T2 becomes equal to or less than a predetermined threshold (for example, 2 μs).

That is, the shifter 101 shifts the levels of the excitation signals EXC+ and EXC− so that the excitation signals EXC+ and EXC− are substantially in close contact with each other.

Next, the trigger generation circuit 102 generates, as a trigger, a rectangular wave in which the voltage value has become a high level during the period ΔT. In FIG. 4, each of two rectangular waves is generated in the vicinity of timing of the peak of the excitation signal EXC+. The trigger generation circuit 102 inputs, as the trigger signal Trg, the two rectangular waves into the trigger signal input port 103a.

The trigger signal input port 103a supplies the input trigger signal Trg to the cycle measuring unit 103b.

After once the period ΔT becomes equal to or less than the predetermined threshold by the shifter 101, the cycle measuring unit 103*b* compares the cycle $T_{Trg}$ of the trigger signal Trg supplied from the cycle measuring unit 103*b* and the cycle $T_{normal}$ that has already been stored in the memory 103*d*. The cycle measuring unit 2103*b* determines that there is the abnormality in the RDC 21 of the resolver circuit 20 when the cycle $T_{Trg}$ and the cycle $T_{normal}$ are different from each other.

For example, when a difference between the cycle $T_{Trg}$ and the cycle $T_{normal}$ is equal to or more than the predetermined threshold, the cycle measuring unit 103*b* may determine that there is the abnormality in the RDC 21 of the resolver circuit 20.

Figure 5:
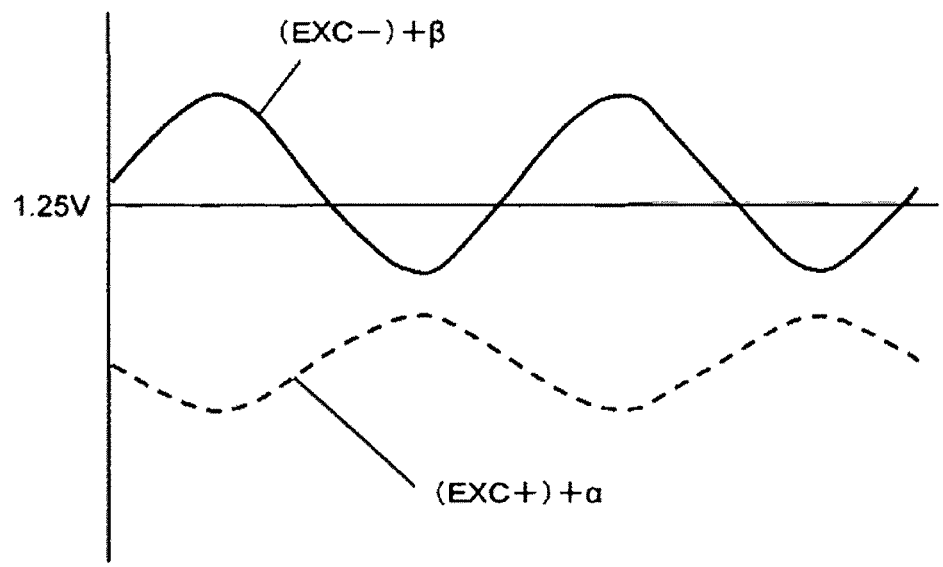
FIG. 5 is an explanatory graphical representation of operation of the diagnostic device according to the first embodiment of the present invention in a case where there is an abnormality in the RDC of a resolver circuit.

Next, operation of the diagnostic device 100A in a case where there is the abnormality in the RDC 21 of the resolver circuit 20 using FIG. 5. FIG. 5 is an explanatory graphical representation of the operation of the diagnostic device 100A according to the first embodiment of the present invention in the case where there is the abnormality in the RDC 21 of the resolver circuit 20.

In FIG. 5, since the abnormality occurs in the RDC 21, an amplitude of the excitation signal (EXC+)+α is smaller than that in FIG. 4. In this case, since the excitation signal (EXC+) +α and the excitation signal (EXC−)+β do not cross each other, the trigger generation circuit 102 cannot generate the trigger signal.

That is, when the RDC 21 is normal, the trigger is generated in the predetermined cycle $T_{Trg}$ as illustrated in FIG. 4. Meanwhile, when the RDC 21 is abnormal, no trigger is generated.

Accordingly, time of a predetermined threshold $T_{out}$ or more has passed since the last trigger (rectangular wave having the high level) is generated. In this case, the cycle diagnosing unit 103*c* determines that there is the abnormality in the resolver circuit 20 so as to notify a motor control unit for controlling the motor M (not illustrated) of the determination.

The motor control unit corresponds to the notification from the cycle diagnosing unit 103*c* so as to cause the motor M to stop drive of the motor M.

As described above, according to the present embodiment, the abnormality in the amplitude of each of the excitation signals EXC+ and EXC− output from the RDC 21 of the resolver circuit 20 can be detected. Therefore, soundness of the resolver circuit can be accurately diagnosed.

[Second Embodiment]

Next, a configuration and operation of a diagnostic device 100B according to a second embodiment of the present invention will be described using FIGS. 6 to 8.

First, an entire configuration of a resolver system including the diagnostic device 100B according to the second embodiment of the present invention will be described using FIG. 6. FIG. 6 is a block diagram of the configuration of the resolver system including the diagnostic device 100B according to the second embodiment of the present invention. Note that portions in FIG. 6 similar to those in FIG. 1 are denoted with the same reference signs.

Figure 6:
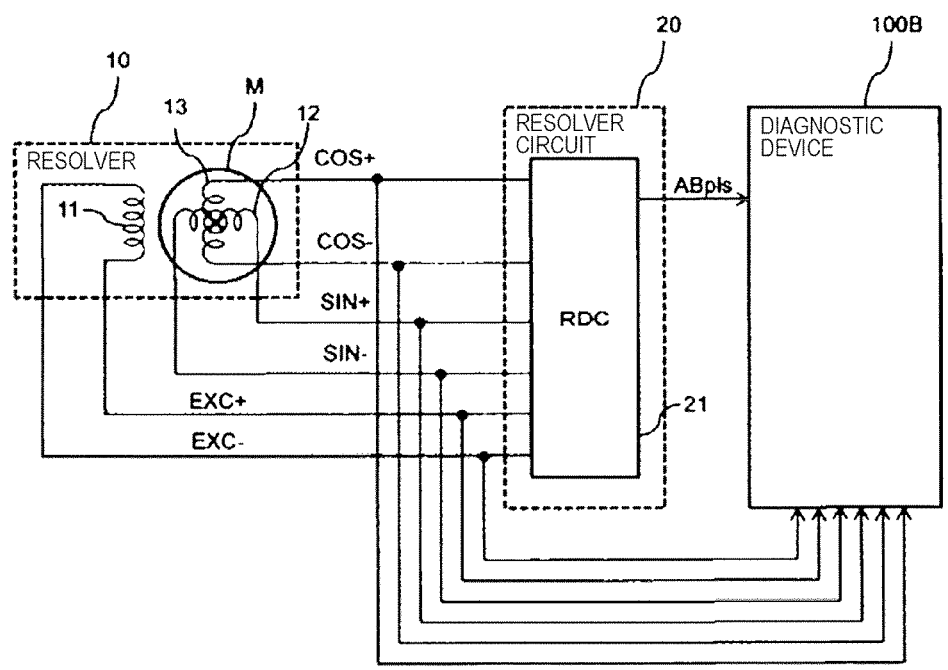
FIG. 6 is a block diagram of a configuration of a resolver system including a diagnostic device according to a second embodiment of the present invention.
Figure 7:
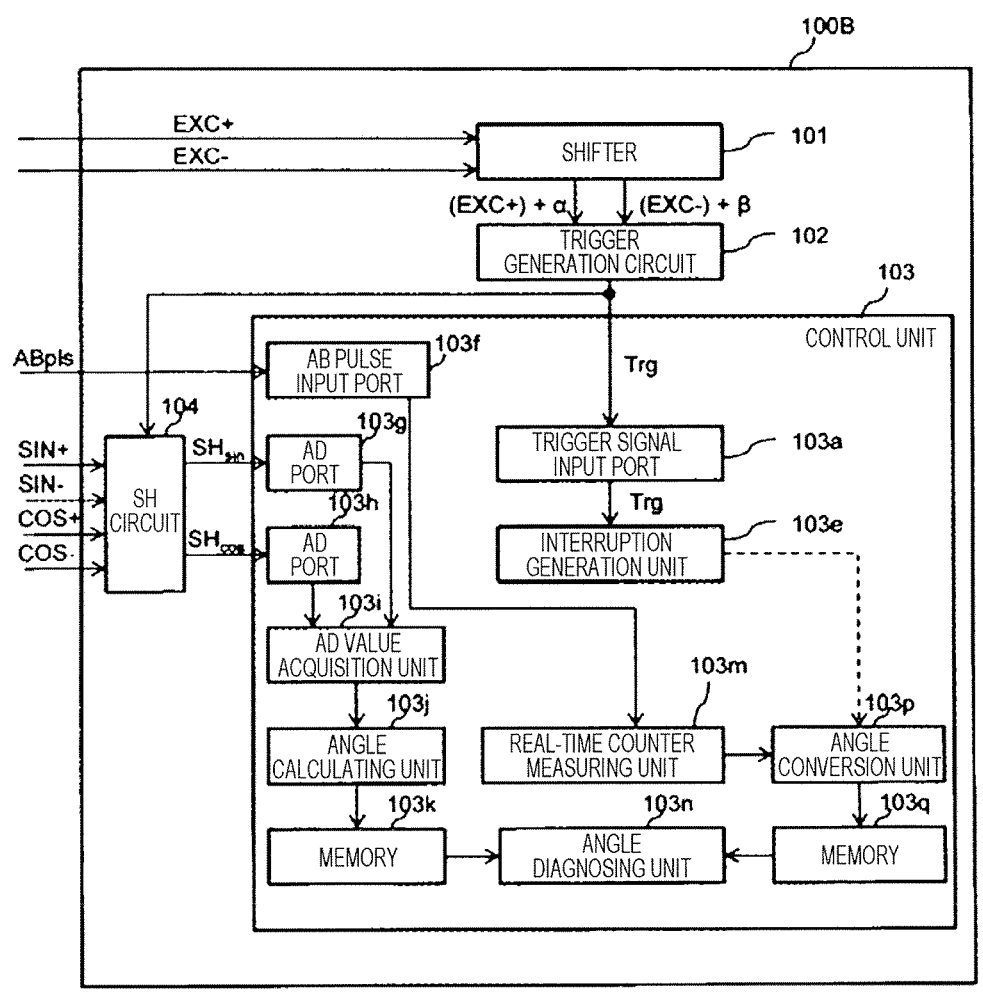
FIG. 7 is a block diagram of a configuration of the diagnostic device according to the second embodiment of the present invention.

FIG. 6 is different from FIG. 1 in that output signals SIN+ and SIN− of a secondary coil 12 of a resolver 10 and output signals COS+ and COS− of a secondary coil 13 of the resolver 10 are input into the diagnostic device 100B. FIG. 6 is also different from FIG. 1 in that an AB pulse (encoder pulse), from an RDC 21, corresponding to a rotational angle θ of a motor is input into the diagnostic device 100B.

Next, the configuration of the diagnostic device 100B according to the second embodiment of the present invention will be described using FIG. 7. FIG. 7 is a block diagram of the configuration of the diagnostic device 100B according to the second embodiment of the present invention. Note that portions in FIG. 7 similar to those in FIG. 2 are denoted with the same reference signs.

A sample-hold circuit 104 holds (samples and holds) a voltage value $SH_{sin}$ of an output signal SIN(=(SIN+)−(SIN−)) from certain timing at which a voltage value of a trigger signal Trg becomes a high level (timing at which a trigger occurs) to timing at which the next trigger occurs, so as to supply the voltage value $SH_{sin}$ to an AD port 103*g* of a control unit 103.

Similarly, based on the trigger signal Trg, the sample-hold circuit 104 holds a voltage value $SH_{cos}$ of an output signal COS from the certain timing at where the trigger occurs to the timing at which the next trigger occurs, so as to supply the voltage value $SH_{cos}$ to an AD port 103*h* of the control unit 103.

That is, the sample-hold circuit 104 holds the voltage value $SH_{sin}$ of the output signal SIN of a resolver 10 and the voltage value $SH_{sin}$ of the output signal COS of the resolver 10 at a peak of an excitation signal EXC (=(EXC+)−(ESC−)) for a predetermined period (trigger cycle $T_{Trg}$), so as to input the voltage values $SH_{sin}$ and $SH_{sin}$ into the AD ports 103*g* and 103*h*, respectively.

Here, the voltage values held by the sample-hold circuit 104 and used for the diagnostic device 100B according to the second embodiment of the present invention will be described using FIG. 8. FIG. 8 is an explanatory graphical representation of the voltage values held by the sample-hold circuit 104 and used for the diagnostic device 100B according to the second embodiment of the present invention. Note that, In FIG. 8, the horizontal axis represents time and the vertical axis represent voltage.

Figure 8:
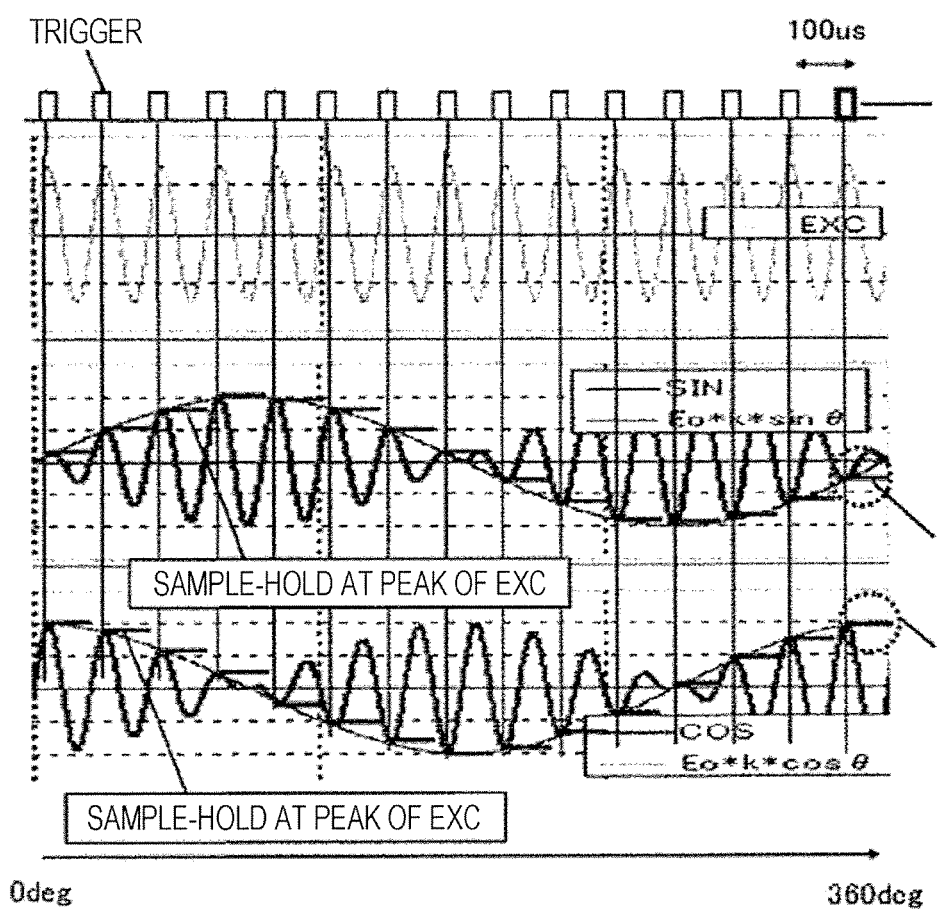
FIG. 8 is an explanatory graphical representation of a voltage value held by a sample-hold circuit and used for the diagnostic device according to the second embodiment of the present invention.

In FIG. 8, the trigger is generated at timing of the peak of the excitation signal EXC. Note that, in this example, the cycle in which the trigger occurs is 100 μs.

The sample-hold circuit 104 holds the voltage values of the output signals SIN and COS at the timing at which the trigger occurs. The voltage values that has been held by the sample-hold circuit 104 are constant during a period during which sample-hold has been performed (trigger cycle $T_{Trg}$). Accordingly, sampling of AD conversion can be performed at arbitrary timing during this period.

Referring back to FIG. 7, the AD port 103*g* converts the voltage value $SH_{sin}$ (analog value) supplied from the sample-hold circuit 104 into a digital value so as to supplies the voltage value $SH_{sin}$ (digital value) as an AD value to an AD value acquisition unit 103*i*.

Similarly, the AD port 103*h* converts the voltage value $SH_{cos}$ (analog value) supplied from the sample-hold circuit 104 into a digital signal so as to supply the voltage value $SH_{cos}$ (digital value) as the AD value to the AD value acquisition unit 103*i*.

The AD value acquisition unit 103*i* acquires the latest AD values $SH_{sin}$ and $SH_{cos}$ supplied from the AD port 103*g* so as to supply the latest AD values $SH_{sin}$ and $SH_{cos}$ to an angle calculating unit 103*j*.

The angle calculating unit 103*j* calculates the rotation angle θ of the motor M at the timing at which the trigger occurs, based on the latest AD values $SH_{sin}$ and $SH_{cos}$ supplied from the AD value acquisition unit 103*i*.

More specifically, the angle calculating unit 103*j* calculates a rotational angle (resolver angle) $θ_1$ of the motor M based on $θ=\tan^{-1}(SH_{sin}/SH_{cos})$. Here, tan an inverse function of tan.

The angle calculating unit 103*j* stores the calculated rotational angle $\theta_1$ in a memory (RAM) 103*k*.

Meanwhile, an AB pulse input port 103*f* receives the AB pulse from the RDC 21 of the resolver circuit 20 so as to supply the AB pulse to a real-time counter measuring unit 103*m*.

The real-time counter measuring unit 103*m* measures, as a counter value, the number of pulses in the AB pulse per unit time so as to supply the counter value to the an angle conversion unit 103*p*.

Here, based on the trigger signal Trg, an interruption generation unit 103*e* supplies an interruption signal to the angle conversion unit 103*p* at the timing at which the trigger occurs.

Based on the interruption signal, at the timing at which the trigger occurs, the angle conversion unit 103*p* converts the counter value supplied from the real-time counter measuring unit 103*m* into a rotational angle $\theta_2$ of the motor M so as to store the rotational angle $\theta_2$ in a memory 103*q*.

An angle diagnosing unit 103*n* determines that there is an abnormality in the resolver circuit 20 when the rotational angle $\theta_1$ of the motor M stored in the memory 103*k* and the rotational angle $\theta_2$ of the motor M stored in the memory 103*q* are different from each other. In this case, the angle diagnosing unit 103*n* notifies a motor control unit (not illustrated) that there is the abnormality in the resolver circuit 20.

The motor control unit corresponds to the notification from the angle diagnosing unit 103*n* so as to cause the motor M to stop drive of the motor M.

As described above, according to the present embodiment, an abnormality of the rotational angle of the motor M calculated by the resolver circuit 20 can be detected. Therefore, soundness of the resolver circuit can be accurately diagnosed.

[Third Embodiment]

Figure 9:
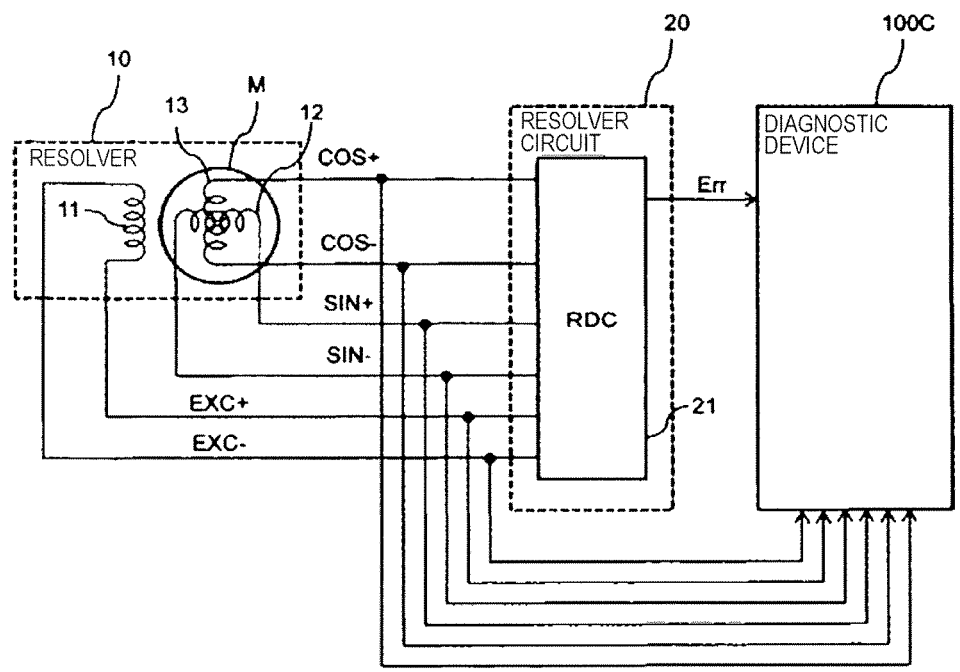
FIG. 9 is a block diagram of a configuration of a resolver system including a diagnostic device according to a third embodiment of the present invention.
Figure 10:
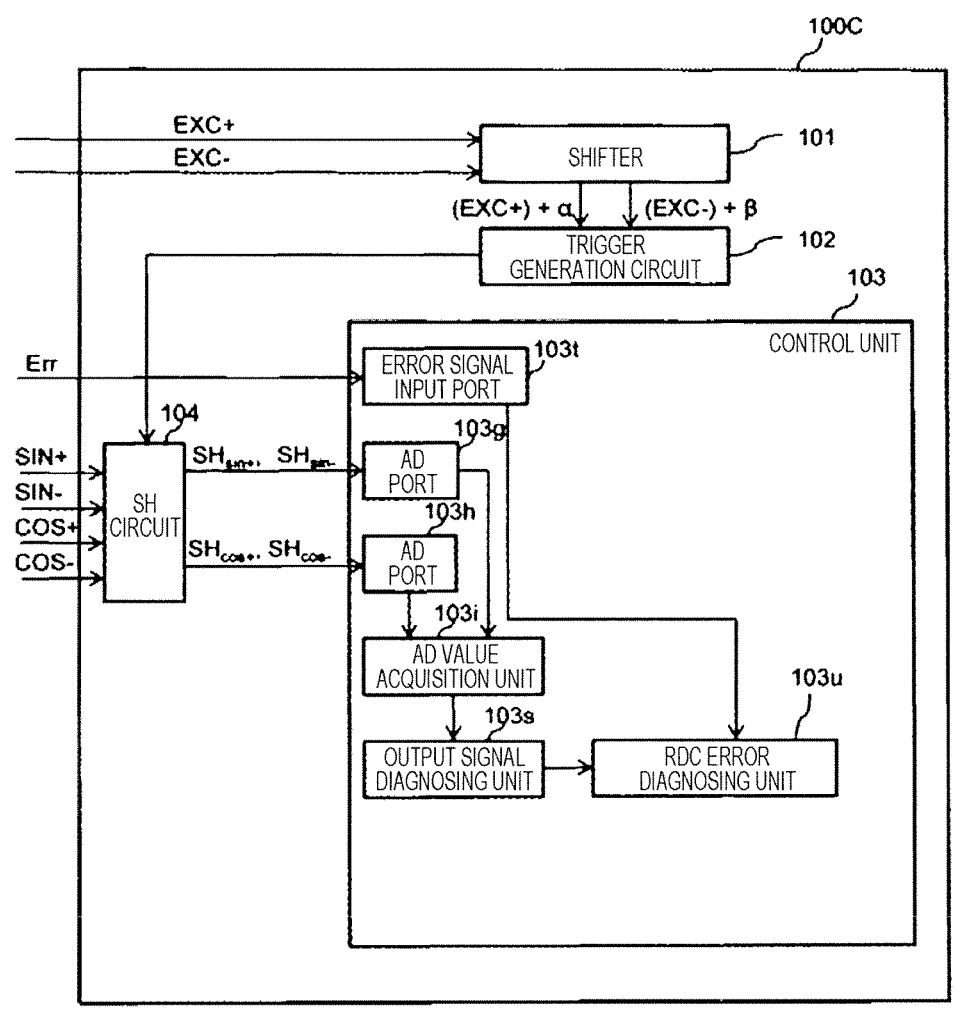
FIG. 10 is a block diagram of the diagnostic device according to the third embodiment of the present invention.
Figure 11:
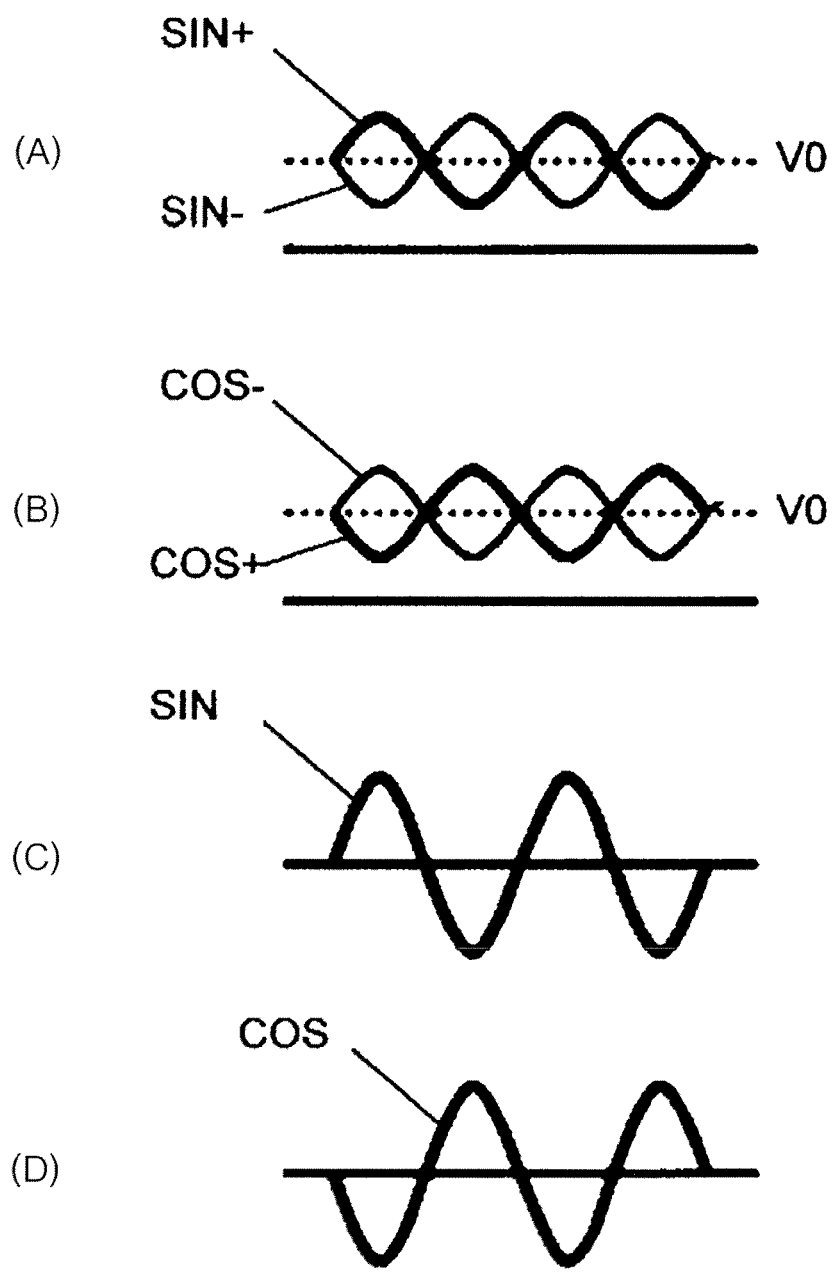
FIGS. 11(A) to (D) illustrate explanatory graphical representations of output signals, from a resolver, to be input into the diagnostic device according to the third embodiment of the present invention.

Next, a configuration and operation of a diagnostic device 100C according to a third embodiment of the present invention using FIGS. 9 to 11.

First, an entire configuration of a resolver system including the diagnostic device 100C according to the third embodiment of the present invention will be described using FIG. 9. FIG. 9 is a block diagram of the configuration of the resolver system including the diagnostic device 100C according to the third embodiment of the present invention. Note that, portions in FIG. 9 similar to those in FIG. 6 are denoted with the same reference signs.

FIG. 9 is different from FIG. 6 in that an error signal Err from an RDC 21, as a result of a self-diagnosis, is input into the diagnostic device 100C

Next, the configuration of the diagnostic device 100C according to the third embodiment of the present invention will be described using FIG. 10. FIG. 10 is a block diagram of the configuration of the diagnostic device 100C according to the third embodiment of the present invention. Note that portions in FIG. 10 similar to those in FIG. 7 are denoted with the same reference signs.

According to the present embodiment, an output signal diagnosing unit 103*s* detects an abnormality in any of output signals SIN and COS from a resolver 10, based on the latest AD values $SH_{sin+}$, $SH_{sin-}$, $SH_{cos+}$, and $SH_{cos-}$ supplied from an AD value acquisition unit 103*i*.

Here, the output signals, from the resolver 10, to be input into the diagnostic device 100C according to the third embodiment of the present invention will be described using FIG. 11. FIG. 10 illustrates explanatory graphical representations of the output signals, from the resolver 10, to be input into the diagnostic device 100C according to the third embodiment of the present invention.

FIG. 11(A) is a graphical representation of the output signals SIN+ and SIN−. In FIG. 11(A), the horizontal axis represents time and the vertical axis represents voltage. Here, the output signals SIN+ and SIN− can be expressed by the following expressions (1) and (2), respectively.

$$(SIN+) = V0 + A*\sin\theta*\sin\omega t \qquad (1)$$

$$(SIN-) = V0 - A*\sin\theta*\sin\omega t \qquad (2)$$

Note that the output signal SIN+ and the output signal SIN− are symmetrical with respect to V0. Reference symbols V0, A, $\theta$, $\omega$, and t represent an offset value, an amplitude, an rotational angle of a motor M (resolver angle), angular velocity of the motor M, and time, respectively. A reference symbol $\omega t$ represents a phase of an excitation signal EXC. According to the present embodiment, V0=1.25 V and A=0.9 are used as recommended values for the RDC 21.

FIG. 11(B) is a graphical representation of the output signals COS+ and COS−. In FIG. 11(B), the horizontal axis represents time and the vertical axis represents voltage. Here, the output signals COS+ and COS− can be expressed by the following expressions (3) and (4)

$$(COS+) = V0 + A*\cos\theta*\sin\omega t \qquad (3)$$

$$(COS-) = V0 - A*\cos\theta*\sin\omega t \qquad (4)$$

Note that the output signal COS+ and the output signal COS− are symmetrical with respect to V0.

FIG. 11(C) is a graphical representation of the output signal SIN(=(SIN+)−(SIN−)). In FIG. 11(C), the horizontal axis represents time and the vertical axis represents voltage. Here, the output signal SIN can be expressed by the following expression (5) with the expressions (1) and (2)

$$SIN = (SIN+) - (SIN-) = 2*A*\sin\theta*\sin\omega t \qquad (5)$$

where 2*A represents an amplitude of the output signal SIN.

FIG. 11(D) is a graphical representation of the output signal COS(=(COS+)−(COS−)). In FIG. 11(D), the horizontal axis represents time and the vertical axis represents voltage. Here, the output signal COS can be expressed by the following expression (6) with the expressions (3) and (4).

$$COS = (COS+) - (COS-) = 2*A*\cos\theta*\sin\omega t \qquad (6)$$

where 2*A represents an amplitude of the output signal COS.

(Offset diagnosis)

Referring back to FIG. 10, the output signal diagnosing unit 103*s* determines whether the latest AD values $SH_{sin+}$ and $SH_{sin-}$ supplied from the AD value acquisition unit 103*i* satisfy the following expression (7).

$$V0 - \delta 1 < ((SIN+) + (SIN-))/2 < V0 + \delta 1.$$

$$V0 - \delta 1 < (SH_{sin+} + SH_{sin-})/2 < V0 + \delta 1 \qquad (7)$$

where $\delta 1$ represents a predetermined threshold.

The output signal diagnosing unit 103*s* determines that there is an abnormality in any of the output signals SIN+ and SIN− from the resolver 10 when expression (7) is not satisfied. In this case, the output signal diagnosing unit 103s notifies an RDC error diagnosing unit 103u of the determination.

Similarly, the output signal diagnosing unit 103s determines whether the latest AD values $SH_{cos+}0$ and $SH_{cos-}$ supplied from the AD value acquisition unit 103i satisfy the following expression (8).

$$V0-\delta 2<((COS+)+(COS-))/2<V0+\delta 2$$

$$V0-\delta 2<(SH_{cos+}+SH_{cos-})/2<V0+\delta 2 \quad (8)$$

where δ2 represents a predetermined threshold.

The output signal diagnosing unit 103s determines that there is an abnormality in any of the output signals COS+ and COS− from the resolver 10 when expression (8) is not satisfied. In this case, the output signal diagnosing unit 103s notifies an RDC error diagnosing unit 103u of the determination.

As a result, the output signal diagnosing unit 103s determines that there is the abnormality in any of the output signals SIN+, SIN−, COS+, and COS− when the absolute value of half of the sum of a value of the output signal SIN+ and a value of the output signal SIN− becomes more than a predetermined threshold or when the absolute value of half of the sum of a value of the output signal COS+ and a value of the output signal COS− becomes more than a predetermined threshold.

Meanwhile, when an abnormality occurs in the RDC 21, an error information input port 103t receives, from the RDC 21, the error signal Err as a result of a self-diagnosis so as to supply the error signal Err to the RDC error diagnosing unit 103u.

The RDC error diagnosing unit 103u determines that there is the abnormality in the RDC 21 of the resolver circuit 20 when receiving the error signal of the RDC 21 from the error information input port 103t or when receiving, the output signal diagnosing unit 103s, an notification in which there is the abnormality in any of the output signals COS+ and COS− from the resolver 10.

That is, the RDC error diagnosing unit 103u compares the result diagnosed by the output signal diagnosing unit 103s and the error signal output from the RDC 21 so as to diagnose soundness of a diagnostic function of the RDC.

When determining that there is the abnormality in the RDC 21, the RDC error diagnosing unit 103u notifies a motor control unit for controlling the motor M (not illustrated) of the determination.

The motor control unit corresponds to the notification from the RDC error diagnosing unit 103u so as to cause the motor M to stop drive of the motor M.

As described above, according to the present embodiment, accuracy for detecting the abnormality in the RDC 21 of the resolver circuit 20 can be improved. Therefore, soundness of the resolver circuit can be accurately diagnosed.

(Amplitude Diagnosis)

The output signal diagnosing unit 103s determines whether the latest AD values $SH_{sin+}$ and $SH_{sin-}$ supplied from the AD value acquisition unit 103i satisfy the following expression (9).

$$2*A-\delta 3<SIN<2*A+\delta 3$$

$$2*A-\delta 3<-SH_{sin-}<2*A+\delta 3 \quad (9)$$

where δ3 represents a predetermined threshold.

The output signal diagnosing unit 103s determines there is the abnormality in any of the output signals SIN+ and SIN− from the resolver 10 when expression (9) is not satisfied. In this case, the output signal diagnosing unit 103s notifies an RDC error diagnosing unit 103u of the determination.

Similarly, the output signal diagnosing unit 103s determines whether the latest AD values $SH_{cos+}$ and $SH_{cos-}$ from the AD value acquisition unit 103i satisfy the following expression (10).

$$2*A-\delta 4<COS<2*A+\delta 4$$

$$2*A-\delta 4<SH_{cos+}-SH_{cos-}<2*A+\delta 4 \quad (10)$$

Here, the output signal diagnosing unit 103s may determine whether the following expression (11) with expressions (9) and (10) is satisfied.

$$1<\sqrt{(SIN^2+COS^2)}<\delta 5 \quad (11)$$

where δ5 is a predetermined threshold.

Whether the absolute value of a difference $\Delta(SIN^2+COS^2)$ between $(SIN^2+COS^2)$ and the previously calculated value satisfies the following expression may be also determined.

$$|\Delta(SIN^2+COS^2)|>\delta 6 \quad (12)$$

where δ6 is a predetermined threshold.

The output signal diagnosing unit 103s determines that there is the abnormality in the output signal when any of expressions (9) to (12) is not satisfied. Operation after the determination is similar to that of the above offset diagnosis.

As described above, according to the present embodiment, accuracy for detecting the abnormality in the RDC 21 of the resolver circuit 20 can be improved. Therefore, soundness of the resolver circuit can be accurately diagnosed.

The present invention is not limited to the above embodiments, and includes various modifications. For example, the above embodiments have been described in detail in order to easily understand the present invention. The present invention is not necessarily limited to including all the configurations having been described above. A part of a configuration in one embodiment can be replaced with a configuration in another embodiment. In addition, a configuration in one embodiment can be added to a configuration in another embodiment. With respect to a part of the configuration in each of the embodiments, additions, deletions, and replacements of the other configurations may be made.

For example, the configuration according to the second embodiment may be added to the configuration according to the first embodiment. Furthermore, the configuration according to the third embodiment may be added.

REFERENCE SIGNS LIST 10 resolver
11 excitation coil (primary coil)
12, 13 secondary coil
20 resolver circuit
21 RDC
100A diagnostic device
101 shifter
102 trigger generation circuit
103 control unit
103a trigger signal input port
103b cycle measuring unit
103c cycle diagnosing unit
103d memory 103e interruption generation unit
103f AB pulse input port
103g, 103h AD port
103i AD value acquisition unit
103j angle calculating unit
103k, 103q memory
103m real-time counter measuring unit
103n angle diagnosing unit
103p angle conversion unit
103s output signal diagnosing unit
103t error signal input port
103u RDC error diagnosing unit
M motor

The invention claimed is:

1. A diagnostic device comprising:
a shifter configured to receive an excitation signal EXC+ to be input to a first end of an excitation coil of a resolver and an excitation signal EXC− to be input to a second end of the excitation coil, and shift a level of at least one of the excitation signal EXC+ and the excitation signal EXC− so that a period from first timing as a starting point to second timing as an end point becomes equal to or less than a predetermined threshold, the first timing and the second timing at which the excitation signal EXC+ and the excitation signal EXC− have a same value in a vicinity of a peak value of the excitation signal EXC+;
a trigger generation circuit configured to generate a trigger during the period;
a sample-hold circuit configured to hold a value of an output signal SIN that is output from a first secondary coil of the resolver and a value of an output signal COS that is output from a second secondary coil of the resolver in timing in which the trigger is generated; and
a control unit configured to diagnose whether there is an abnormality in a resolver circuit based on the trigger.

2. The diagnostic device according to claim 1,
wherein the control unit includes:
a cycle measuring unit that measures a cycle in which the trigger is generated; and
a cycle diagnosing unit that determines that there is the abnormality in the resolver circuit when the cycle is different from a predetermined value.

3. The diagnostic device according to claim 1,
wherein the control unit includes:
an angle calculating unit that calculates a rotational angle of a motor based on the value of the output signal SIN and the value of the output signal COS that have been held by the sample-hold circuit;
an angle conversion unit that calculates a rotational angle of the motor based on an encoder pulse that is supplied from the resolver circuit; and
an angle diagnosing unit that determines that there is the abnormality in the resolver circuit when the rotational angle of the motor calculated by the angle calculating unit and the rotational angle of the motor calculated by the angle conversion unit are different from each other.

4. A diagnostic device comprising:
a shifter configured to receive an excitation signal EXC+ to be input to a first end of an excitation coil of a resolver and an excitation signal EXC− to be input to a second end of the excitation coil, and shift a level of at least one of the excitation signal EXC+ and the excitation signal EXC− so that a period from first timing as a starting point to second timing as an end point becomes equal to or less than a predetermined threshold, the first timing and the second timing at which the excitation signal EXC+ and the excitation signal EXC− have a same value in a vicinity of a peak value of the excitation signal EXC+;
a trigger generation circuit configured to generate a trigger during the period;
a control unit configured to diagnose whether there is an abnormality in a resolver circuit based on the trigger; and
a sample-hold circuit configured to hold a value of an output signal SIN+ that is output from a first end of a first secondary coil of the resolver, an output signal SIN− that is output from a second end of the first secondary coil, a value of an output signal COS+ that is output from a first end of a second secondary coil of the resolver, and a value of an output signal COS− that is output from a second end of the second secondary coil,
wherein the control unit determines that there is an abnormality in any of the output signals SIN+, SIN−, COS+, and COS− when an absolute value of half of a sum of the value of the output signal SIN+ and the value of the output signal SIN− becomes more than a predetermined threshold or when an absolute value of half of a sum of the value of the output signal COS+ and the value of the output signal COS− becomes more than a predetermined threshold.

5. The diagnostic device according to claim 1, further comprising:
an output signal diagnosing unit configured to determine whether there is an abnormality in an amplitude of the output signal SIN or the output signal COS based on the value of the output signal SIN and the value of the output signal COS that have been held by the sample-hold circuit.

* * * * *